US009329871B2

(12) United States Patent
MacInnis et al.

(10) Patent No.: US 9,329,871 B2
(45) Date of Patent: May 3, 2016

(54) VIDEO DECODING SYSTEM SUPPORTING MULTIPLE STANDARDS

(75) Inventors: Alexander G. MacInnis, Los Altos, CA (US); Jose' R. Alvarez, Sunnyvale, CA (US); Sheng Zhong, Fremont, CA (US); Xiaodong Xie, Fremont, CA (US); Vivian Hsiun, Yorba Linda, CA (US)

(73) Assignee: BROADCOM CORPORATION, Irvine, CA (US)

( * ) Notice: Subject to any disclaimer, the term of this patent is extended or adjusted under 35 U.S.C. 154(b) by 904 days.

(21) Appl. No.: 13/608,192

(22) Filed: Sep. 10, 2012

(65) Prior Publication Data

US 2012/0328000 A1    Dec. 27, 2012

Related U.S. Application Data

(62) Division of application No. 10/114,798, filed on Apr. 1, 2002, now Pat. No. 8,284,844.

(51) Int. Cl.
*H04N 7/18* (2006.01)
*G06F 9/38* (2006.01)
(Continued)

(52) U.S. Cl.
CPC ............ *G06F 9/3861* (2013.01); *G06F 9/3877* (2013.01); *H04N 19/12* (2014.11);
(Continued)

(58) Field of Classification Search
CPC .................. H04N 19/00278; H04N 19/00066; H04N 19/0009; H04N 19/00533; H04N 19/00521; H04N 19/00472
USPC ........................................ 375/240.01–240.29
See application file for complete search history.

(56) References Cited

U.S. PATENT DOCUMENTS 5,610,657 A    3/1997    Zhang
5,708,511 A    1/1998    Gandhi et al.
(Continued)

FOREIGN PATENT DOCUMENTS

EP    0663762    7/1995

OTHER PUBLICATIONS

Lee B W et al: "Data Flow Processor for Multi-Standard Video Codec", Custom Integrated Circuits Conference, 1994, Proceedings of the IEEE 1994 San Diego, CA USA, May 1-4, 1994, New York, NY, USA, IEEE, May 1, 1994, pp. 103-106, XP010129914, ISBN: 0-7803-1886-2.

(Continued)

*Primary Examiner* — Andy Rao
(74) *Attorney, Agent, or Firm* — Foley & Lardner LLP; Christopher J. McKenna; Daniel E. Rose

(57) ABSTRACT

System and method for decoding digital video data. The decoding system employs hardware accelerators that assist a core processor in performing selected decoding tasks. The hardware accelerators are configurable to support a plurality of existing and future encoding/decoding formats. The accelerators are configurable to support substantially any existing or future encoding/decoding formats that fall into the general class of DCT-based, entropy decoded, block-motion-compensated compression algorithms. The hardware accelerators illustratively comprise a programmable entropy decoder, an inverse quantization module, a inverse discrete cosine transform module, a pixel filter, a motion compensation module and a de-blocking filter. The hardware accelerators function in a decoding pipeline wherein at any given stage in the pipeline, while a given function is being performed on a given macroblock, the next macroblock in the data stream is being worked on by the previous function in the pipeline.

20 Claims, 9 Drawing Sheets

(51) Int. Cl.

| | | |
|---|---|---|
| *H04N 19/176* | (2014.01) | |
| *H04N 19/70* | (2014.01) | |
| *H04N 19/122* | (2014.01) | |
| *H04N 19/129* | (2014.01) | |
| *H04N 19/61* | (2014.01) | |
| *H04N 19/60* | (2014.01) | |
| *H04N 19/12* | (2014.01) | |
| *H04N 19/91* | (2014.01) | |
| *H04N 19/157* | (2014.01) | |
| *H04N 19/44* | (2014.01) | |
| *H04N 19/82* | (2014.01) | |
| *H04N 19/423* | (2014.01) | |
| *H04N 19/90* | (2014.01) | |
| *H04N 19/625* | (2014.01) | |

(52) U.S. Cl.
CPC .......... *H04N 19/122* (2014.11); *H04N 19/129* (2014.11); *H04N 19/157* (2014.11); *H04N 19/176* (2014.11); *H04N 19/423* (2014.11); *H04N 19/44* (2014.11); *H04N 19/60* (2014.11); *H04N 19/61* (2014.11); *H04N 19/625* (2014.11); *H04N 19/70* (2014.11); *H04N 19/82* (2014.11); *H04N 19/90* (2014.11); *H04N 19/91* (2014.11)

(56) References Cited

U.S. PATENT DOCUMENTS

| | | |
|---|---|---|
| 5,809,270 A | 9/1998 | Robbins |
| 5,815,206 A | 9/1998 | Malladi et al. |
| 6,052,415 A | 4/2000 | Carr et al. |
| 6,538,656 B1 | 3/2003 | Cheung et al. |
| 6,542,541 B1 | 4/2003 | Luna et al. |
| 6,553,072 B1 | 4/2003 | Chiang et al. |
| 6,570,579 B1 | 5/2003 | MacInnis et al. |
| 6,573,905 B1 | 6/2003 | MacInnis et al. |
| 6,636,222 B1 | 10/2003 | Valmiki et al. |
| 6,647,061 B1* | 11/2003 | Panusopone ... H04N 21/234309 375/240.12 |
| 6,661,422 B1 | 12/2003 | Valmiki et al. |
| 6,768,774 B1 | 7/2004 | MacInnis et al. |
| 6,792,048 B1 | 9/2004 | Lee et al. |
| 6,798,420 B1 | 9/2004 | Xie |
| 6,842,124 B2 | 1/2005 | Penna |
| 2001/0046260 A1 | 11/2001 | Molloy |
| 2002/0085021 A1* | 7/2002 | Sullivan ........... H04N 21/25808 715/716 |
| 2003/0235251 A1 | 12/2003 | Hsiun et al. |
| 2004/0233332 A1 | 11/2004 | Takashimizu et al. |

OTHER PUBLICATIONS

Bose S et al: "A Single Chip Multistandard Video Codec", Custom Integrated Circuits Conference, 1993, Proceedings of the IEEE 1993 San Diego, CA, USA, May 9-12, 1993, New York, NY, USA, IEEE, May 9, 1993, pp. 1141-1144, XP010222103, ISBN: 0-7803-0826-3.

Bailey D: "Programmable Vision Processor/Controller for Flexible Implementaion of Current and Future Image Compression Standards", IEEE Micro, IEEE Inc., New York, USA, vol. 12 No. 5, Oct. 1, 1992, pp. 33-39, XP000330855, ISSN: 0272-1732.

Herrmann K et al: "Design of a Development System for Multimedia applications Based on a Single Chip Mutliprocessor Array" Electronic, Circuits and Systems, 1996, ICECS '96, Proceedings of the Third IEEE International Conference on Rodos, Greece Oct. 13-16, 1996, New York, NY, USA, IEEE, Oct. 13, 1996, pp. 1151-1154, XP010217275, ISBN: 0-7803-3650-X.

EP03007419 Search Report dated Jun. 22, 2005.

* cited by examiner

VIDEO DECODING SYSTEM SUPPORTING MULTIPLE STANDARDS

CROSS-REFERENCE TO RELATED APPLICATIONS

This is a divisional application of and claims priority to U.S. patent application Ser. No. 10/114,798, filed on Apr. 1, 2002, having the title "VIDEO DECODING SYSTEM SUPPORTING MULTIPLE STANDARDS," and issued as U.S. Pat. No. 8,284,844 on Oct. 9, 2012, which is incorporated by reference herein as if expressly set forth in its entirety.

FIELD OF THE INVENTION

The present invention relates generally to video decoding systems, and more particularly to a video decoding system supporting multiple standards.

BACKGROUND

Digital video decoders decode compressed digital data that represent video images in order to reconstruct the video images. A relatively wide variety of encoding/decoding algorithms and encoding/decoding standards presently exist, and many additional algorithms and standards are sure to be developed in the future. The various algorithms and standards produce compressed video bit streams of a variety of formats. Some existing public format standards include MPEG-1, MPEG-2 (SD/HD), MPEG-4, H.263, H.263+ and H.26LIJVT. Also, private standards have been developed by Microsoft Corporation (Windows Media), RealNetworks, Inc., Apple Computer, Inc. (QuickTime), and others. It would be desirable to have a multi-format decoding system that can accommodate a variety of encoded bit stream formats, including existing and future standards, and to do so in a cost-effective manner.

A highly optimized hardware architecture can be created to address a specific video decoding standard, but this kind of solution is typically limited to a single format. On the other hand, a fully software based solution is often flexible enough to handle any encoding format, but such solutions tend not to have adequate performance for real time operation with complex algorithms, and also the cost tends to be too high for high volume consumer products. Currently a common software based solution is to use a general-purpose processor running in a personal computer, or to use a similar processor in a slightly different system. Sometimes the general-purpose processor includes special instructions to accelerate digital signal processor (DSP) operations such as multiply-accumulate (MAC); these extensions are intimately tied to the particular internal processor architecture. For example, in one existing implementation, an Intel Pentium processor includes an MMX instruction set extension. Such a solution is limited in performance, despite very high clock rates, and does not lend itself to creating mass market, commercially attractive systems.

Others in the industry have addressed the problem of accommodating different encoding/decoding algorithms by designing special purpose DSPs in a variety of architectures. Some companies have implemented Very Long Instruction Word (VLIW) architectures more suitable to video processing and able to process several instructions in parallel. In these cases, the processors are difficult to program when compared to a general-purpose processor. Despite the fact that the DSP and VLIW architectures are intended for high performance, they still tend not to have enough performance for the present purpose of real time decoding of complex video algorithms. In special cases, where the processors are dedicated for decoding compressed video, special processing accelerators are tightly coupled to the instruction pipeline and are part of the core of the main processor.

Yet others in the industry have addressed the problem of accommodating different encoding/decoding algorithms by simply providing multiple instances of hardware, each dedicated to a single algorithm. This solution is inefficient and is not cost-effective.

Further limitations and disadvantages of conventional and traditional approaches will become apparent to one of skill in the art through comparison of such systems with the present invention as set forth in the remainder of the present application with reference to the drawings.

SUMMARY

One aspect of the present invention is directed to a digital media decoding system having a processor and a hardware accelerator. The processor is adapted to control a decoding process. The hardware accelerator is coupled to the processor and performs a decoding function on a digital media data stream. The accelerator is configurable to perform the decoding function according to a plurality of decoding methods.

Another aspect of the present invention is directed to a method of decoding a digital media data stream. Pursuant to the method, in a first stage, a first decoding function is performed on an $i^{th}$ data element of the data stream with a first decoding accelerator. In a second stage, after the first stage, a second decoding function is performed on the $i^{th}$ data element with a second decoding accelerator, while the first decoding function is performed on an $i+1^{st}$ data element in the data stream with the first decoding accelerator.

Another aspect of the present invention is directed to a method of decoding a digital video data stream. Pursuant to the method, in a first stage, entropy decoding is performed on an $i^{th}$ data element of the data stream. In a second stage, after the first stage, inverse quantization is performed on a product of the entropy decoding of the $i^{th}$ data element, while entropy decoding is performed on an $i+1^{st}$ data element in the data stream.

Still another aspect of the present invention is directed to a method of decoding a digital media data stream. Pursuant to this method, media data of a first encoding/decoding format is received. At least one external decoding function is configured based on the first encoding/decoding format. Media data of the first encoding/decoding format is decoded using the at least one external decoding function. Media data of a second encoding/decoding format is received. The at least one external decoding function is configured based on the second encoding/decoding format. Then media data of the second encoding/decoding format is decoded using the at least one external decoding function.

It is understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE EMBODIMENTS

Figure 1:
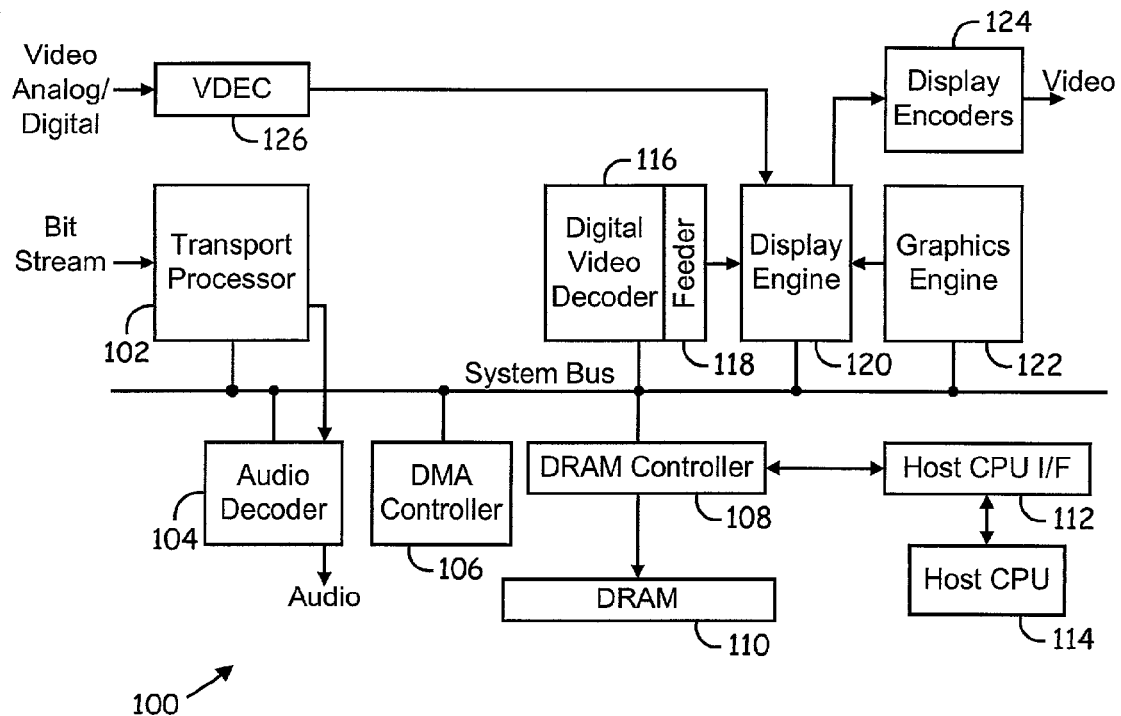
FIG. 1 is a functional block diagram of a digital media system in which the present invention may be illustratively employed.

The present invention forms an integral part of a complete digital media system and provides flexible and programmable decoding resources. FIG. 1 is a functional block diagram of a digital media system in which the present invention may be illustratively employed. It will be noted, however, that the present invention can be employed in systems of widely varying architectures and widely varying designs.

The digital media system of FIG. 1 includes transport processor 102, audio decoder 104, direct memory access (DMA) controller 106, system memory controller 108, system memory 110, host CPU interface 112, host CPU 114, digital video decoder 116, display feeder 118, display engine 120, graphics engine 122, display encoders 124 and analog video decoder 126. The transport processor 102 receives and processes a digital media data stream. The transport processor 102 provides the audio portion of the data stream to the audio decoder 104 and provides the video portion of the data stream to the digital video decoder 116. In one embodiment, the audio and video data is stored in main memory 110 prior to being provided to the audio decoder 104 and the digital video decoder 116. The audio decoder 104 receives the audio data stream and produces a decoded audio signal. DMA controller 106 controls data transfer amongst main memory 110 and memory units contained in elements such as the audio decoder 104 and the digital video decoder 116. The system memory controller 108 controls data transfer to and from system memory 110. In an illustrative embodiment, system memory 110 is a dynamic random access memory (DRAM) unit. The digital video decoder 116 receives the video data stream, decodes the video data and provides the decoded data to the display engine 120 via the display feeder 118. The analog video decoder 126 digitizes and decodes an analog video signal (NTSC or PAL) and provides the decoded data to the display engine 120. The graphics engine 122 processes graphics data in the data stream and provides the processed graphics data to the display engine 120. The display engine 120 prepares decoded video and graphics data for display and provides the data to display encoders 124, which provide an encoded video signal to a display device.

Figure 2:
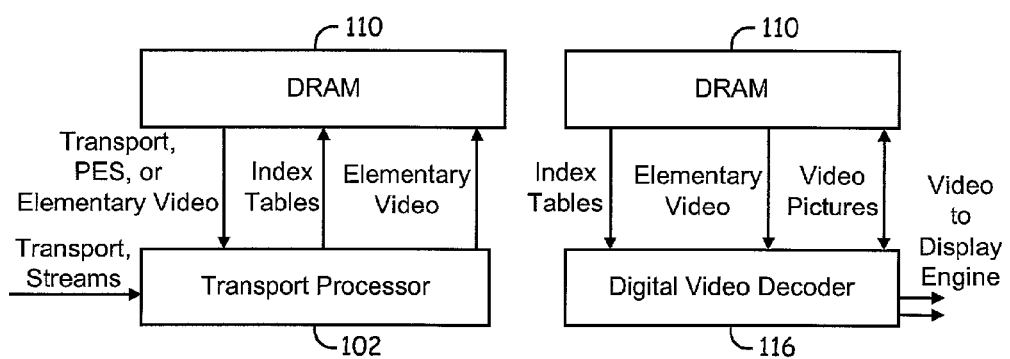
FIG. 2 is a functional block diagram demonstrating a video decode data flow according to an illustrative embodiment of the present invention.

FIG. 2 is a functional block diagram demonstrating a video decode data flow according to an illustrative embodiment of the present invention. Transport streams are parsed by the transport processor 102 and written to main memory 110 along with access index tables. The video decoder 116 retrieves the compressed video data for decoding, and the resulting decoded frames are written back to main memory 110. Decoded frames are accessed by the display feeder interface 118 of the video decoder for proper display by a display unit. In FIG. 2, two video streams are shown flowing to the display engine 120, suggesting that, in an illustrative embodiment, the architecture allows multiple display streams by means of multiple display feeders.

Aspects of the present invention relate to the architecture of digital video decoder 116. In accordance with the present invention, a moderately capable general purpose CPU with widely available development tools is used to decode a variety of coded streams using hardware accelerators designed as integral parts of the decoding process.

Specifically, the most widely-used compressed video formats fall into a general class of DCT-based, variable-length coded, block-motion-compensated compression algorithms. As mentioned above, these types of algorithms encompass a wide class of international, public and private standards, including MPEG-1, MPEG-2 (SD/HD), MPEG-4, H.263, H.263+, H.26LINT, Microsoft Corp, Real Networks, QuickTime, and others. Fundamental functions exist that are common to most or all of these formats. Such functions include, for example, programmable variable-length decoding (VLD), arithmetic decoding (AC), inverse quantization (IQ), inverse discrete cosine transform (IDCT), pixel filtering (PF), motion compensation (MC), and deblocking/de-ringing (loop filtering or post-processing). The term "entropy decoding" may be used generically to refer to variable length decoding, arithmetic decoding, or variations on either of these. According to the present invention, these functions are accelerated by hardware accelerators.

However, each of the algorithms mentioned above implement some or all of these functions in different ways that prevent fixed hardware implementations from addressing all requirements without duplication of resources. In accordance with one aspect of the present invention, these hardware modules are provided with sufficient flexibility or programmability enabling a decoding system that decodes a variety of standards efficiently and flexibly.

The decoding system of the present invention employs high-level granularity acceleration with internal programmability or configurability to achieve the requirements above by implementation of very fundamental processing structures that can be configured dynamically by the core decoder processor. This contrasts with a system employing fine-granularity acceleration, such as multiply-accumulate (MAC), adders, multipliers, FFT functions, DCT functions, etc. In a fine-granularity acceleration system, the decompression algorithm has to be implemented with firmware that uses individual low-level instructions (such as MAC) to implement a high-level function, and each instruction runs on the core processor. In the high-level granularity system of the present invention, the firmware configures each hardware accelerator, which in turn represent high-level functions (such as motion compensation) that run (using a well-defined specification of input data) without intervention from the main core processor. Therefore, each hardware accelerator runs in parallel according to a processing pipeline dictated by the firmware in the core processor. Upon completion of the high-level functions, each accelerator notifies the main core processor, which in turn decides what the next processing pipeline step should be.

The software control typically consists of a simple pipeline that orchestrates decoding by issuing commands to each hardware accelerator module for each pipeline stage, and a status reporting mechanism that makes sure that all modules have completed their pipeline tasks before issuing the start of the next pipeline stage.

Figure 3:
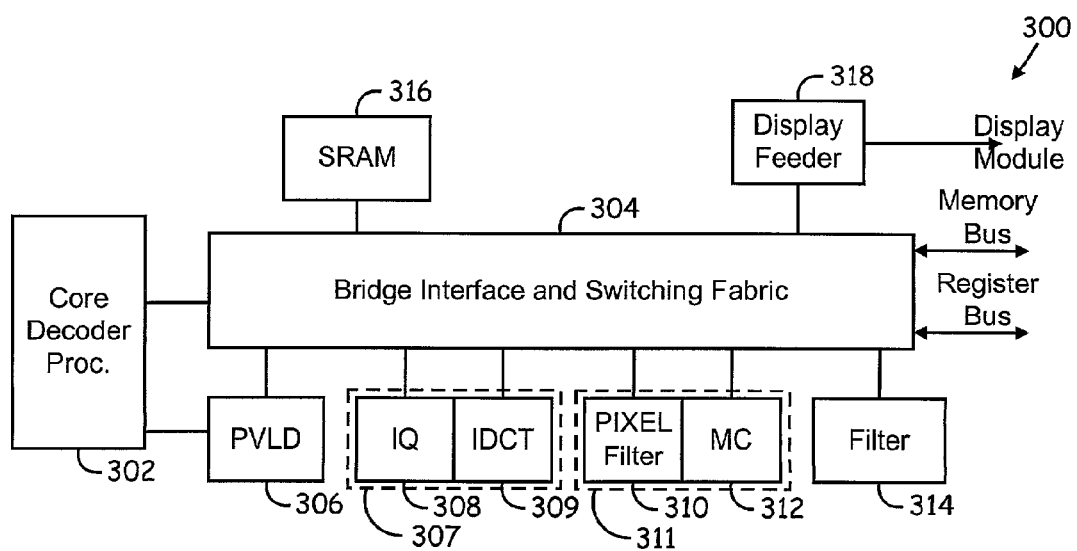
FIG. 3 is a high-level functional block diagram of a digital video decoding system according to an illustrative embodiment of the present invention.

FIG. 3 is a high-level functional block diagram of a digital video decoding system 300 according to an illustrative embodiment of the present invention. The digital video decoding system 300 of FIG. 3 can illustratively be employed to implement the digital video decoder 116 of FIGS. 1 and 2. The core processor 302 is the central control unit of the decoding system 300. The core processor 302 prepares the data for decoding. The core processor 302 also orchestrates the macroblock (MB) processing pipeline for all modules and fetches the required data from main memory via the bridge 304. The core processor 302 also handles some data processing tasks. Picture level processing, including sequence headers, GOP headers, picture headers, time stamps, macroblock-level information except the block coefficients, and buffer management, are performed directly and sequentially by the core processor 302, without using the accelerators 304, 306, 308, 309, 310, 312 and 314 other than the PVLD 306 (which accelerates general bitstream parsing). Picture level processing does not overlap with slice level/macroblock decoding in this embodiment.

Programmable variable length decoder (PVLD) 306, inverse quantizer 308, inverse transform module 309, pixel filter 310, motion compensation module 312 and loop/post filter 314 are hardware accelerators that accelerate special decoding tasks that would otherwise be bottlenecks for real-time video decoding if these tasks were handled by the core processor 302 alone. Each hardware module 306, 308, 309, 310, 312 and 314 is internally configurable or programmable to allow changes according to various processing algorithms. In an alternative embodiment, modules 308 and 309 are implemented in the form of a transform engine 307 that handles all functionality, but which is conceptually equivalent to the union of 308 and 309. In a further alternative embodiment, modules 310 and 312 are implemented in the form of a filter engine 311 which consists of an internal SIMD (single instruction multiple data) processor and a general purpose controller to interface to the rest of the system, but which is conceptually equivalent to the union of 310 and 312. In a further alternative embodiment, module 314 is implemented in the form of another filter engine similar to 311 which consists of an internal SIMD (single instruction multiple data) processor and a general purpose controller to interface to the rest of the system, but which is conceptually equivalent to 314. In a further alternative embodiment, module 314 is implemented in the form of the same filter engine 311 that can also implement the equivalent function of the combination of 310 and 311. Each hardware module 306, 308, 309, 310, 312 and 314 performs its task after being so instructed by the core processor 302. In an illustrative embodiment of the present invention, each hardware module includes a status register that indicates whether the module has completed its assigned tasks. The ore processor 302 polls the status register to determine whether the hardware module has completed its task. In an alternative embodiment, the hardware accelerators share a status register.

In an illustrative embodiment, the PVLD engine 306 performs variable-length code (VLD) decoding of the block DCT coefficients. It also helps the core processor 302 to decode the header information in the compressed bitstream. In an illustrative embodiment of the present invention, the PVLD module 306 is designed as a coprocessor to the core processor 302, while the rest of the modules 308,309,310,312 and 314 are designed as hardware accelerators. Also, in an illustrative embodiment, the PVLD module 306 includes two variable-length decoders. Each of the two programmable variable-length decoders can be hardwired to efficiently perform decoding according to a particular video compression standard, such as MPEG2 HD. One of them can be optionally set as a programmable VLD engine, with a code RAM to hold VLC tables for media coding formats other than MPEG2. The two VLD engines are controlled independently by the core processor 302, and either one or both of them will be employed at any given time, depending on the application.

The IQ engine 308 performs run-level pair decoding, inverse scan and quantization. The inverse transform engine 309 performs IDCT operations or other inverse transform operations like the Integer Transform of the H.26x standards. In an illustrative embodiment of the present invention, the IQ module 308 and the inverse transform module 309 are part of a common hardware module and use a similar interface to the core processor 302.

The pixel filter 310 performs pixel filtering and interpolation. The motion compensation module 312 performs motion compensation. The pixel filter 310 and motion compensation module 312 are shown as one module in the diagram to emphasize a certain degree of direct cooperation between them. In an illustrative embodiment of the present invention, the PF module 310 and the MC module 312 are part of a common programmable module 311 designated as a filter engine capable of performing internal SIMD instructions to process data in parallel with an internal control processor.

The filter module 314 performs the de-blocking operation common in many low bit-rate coding standards. In one embodiment of the present invention, the filter module comprises a loop filter that performs de-blocking within the decoding loop. In another embodiment, the filter module comprises a post filter that performs de-blocking outside the decoding loop. In yet another embodiment, the filter module comprises a de-ringing filter, which may function as either a loop filter or a post filter, depending on the standard of the video being processed. In yet another embodiment, the filter module 314 includes both a loop filter and a post filter. Furthermore, in yet another embodiment, the filter module 314 is implemented using the same filter engine 311 implementation as for 310 and 312, except that module 311 is programmed to produce deblocked or deringed data as the case may be.

The bridge module 304 arbitrates and moves picture data between decoder memory 316 and main memory. The bridge interface 304 includes an internal bus network that includes arbiters and a direct memory access (DMA) engine. The bridge 304 serves as an interface to the system buses.

In an illustrative embodiment of the present invention, the display feeder module 318 reads decoded frames from main memory and manages the horizontal scaling and displaying of picture data. The display feeder 318 interfaces directly to a display module. In an illustrative embodiment, the display feeder 318 converts from 420 to 422 color space. Also, in an illustrative embodiment, the display feeder 318 includes multiple feeder interfaces, each including its own independent color space converter and horizontal scaler. The display feeder 318 handles its own memory requests via the bridge module 304.

Decoder memory 316 is used to store macroblock data and other time-critical data used during the decode process. Each hardware block 306, 308, 309, 310, 312, 314 accesses decoder memory 316 to either read the data to be processed or write processed data back. In an illustrative embodiment of the present invention, all currently used data is stored in decoder memory 316 to minimize accesses to main memory. Each hardware module 306, 308, 309, 310, 312, 314 is assigned one or more buffers in decoder memory 316 for data processing. Each module accesses the data in decoder memory 316 as the macro blocks are processed through the system. In an exemplary embodiment, decoder memory 316 also includes parameter buffers that are adapted to hold parameters that are needed by the hardware modules to do their job at a later macroblock pipeline stage. The buffer addresses are passed to the hardware modules by the core processor 302. In an illustrative embodiment, decoder memory 316 is a static random access memory (SRAM) unit.

Figure 4A:
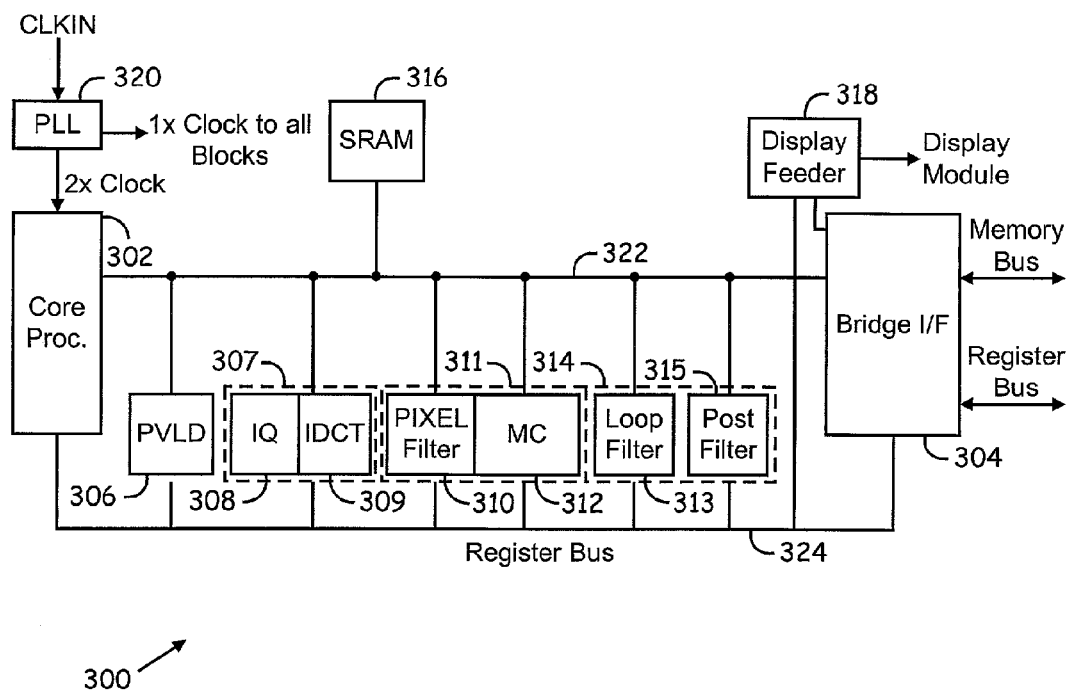
FIG. 4a is a functional block diagram of a digital video decoding system according to an illustrative embodiment of the present invention.

FIG. 4a is a functional block diagram of digital video decoding system 300 according to an illustrative embodiment of the present invention. In FIG. 4a, elements that are common to FIG. 3 are given like reference numbers. In FIG. 4a, various elements are grouped together to illustrate a particular embodiment where 308 and 309 form part of a transform engine 307, 310 and 312 form part of a filter engine 311 that is a programmable module that implements the functionality of PF and MC, 313 and 315 form part of another filter engine 314 which is another instance of the same programmable module except that it is programmed to implement the functionality of a loop filter 313 and a post filter 315. In addition to the elements shown in FIG. 3, FIG. 4a shows, phase-locked loop (PLL) element 320, internal data bus 322, register bus 324 and separate loop and post filters 313 and 315 embodied in a filter engine module 314 which implements the functionality of 313 and 315.

The core processor 302 is the master of the decoding system 300. It controls the data flow of decoding processing. All video decode processing, except where otherwise noted, is performed in the core processor. The PVLD 306, IQ 308, inverse transform 309, PF 310 and MC 312, and filter 314 are hardware accelerators to help the core processor achieve the required performance. In an illustrative embodiment of the present invention, the core processor 302 is a MIPS processor, such as a MIPS32 implementation, for example. The core processor 302 incorporates a D cache and an I cache. The cache sizes are chosen to ensure that time critical operations are not impacted by cache misses. For example, instructions for macroblock-level processing of MPEG-2 video runs from cache. For other algorithms, time-critical code and data also reside in cache. The determination of exactly which functions are stored in cache involves a trade-off between cache size, main memory access time, and the degree of certainty of the firmware implementation for the various algorithms. The cache behavior with proprietary algorithms depends in part in the specific software design. In an illustrative embodiment, the cache sizes are 16 kB for instructions and 4 kB for data. These can be readily expanded if necessary.

At the macroblock level, the core processor 302 interprets the decoded bits for the appropriate headers and decides and coordinates the actions of the hardware blocks 306, 308, 309, 310, 312 and 314. Specifically, all macroblock header information, from the macroblock address increment (MBAinc) to motion vectors (MV s) and to the cbp pattern in the case of MPEG2 decoding, for example, is derived by the core processor 302. The core processor 302 stores related information in a particular format or data structure (determined by the hardware module specifications) in the appropriate buffers in the decoder memory 316. For example, the quantization scale is passed to the buffer for the IQ engine 308; macroblock type, motion type and pixel precision are stored in the parameter buffer for the pixel filter engine 310. The core processor keeps track of certain information in order to maintain the correct pipeline, and it may store some such information in its D cache, some in main system memory and some in the decoder memory 316, as required by the specific algorithm being performed. For example, for some standards, motion vectors of the macroblock are kept as the predictors for future motion vector derivation.

In an illustrative embodiment the programmable variable length decoder 306 performs decoding of variable length codes (VLC) in the compressed bit stream to extract values, such as DCT coefficients, from the compressed data stream. Different coding formats generally have their own unique VLC tables. The PVLD 306 is completely configurable in terms of the VLC tables it can process. The PVLD 306 can accommodate a dynamically changing set of VLC tables, for example they may change on a macroblock-to-macroblock basis. In an illustrative embodiment of the present invention, the PVLD 306 includes a register that the core processor can program to guide the PVLD 306 to search for the VLC table of the appropriate encoding/decoding algorithm. The PVLD 306 decodes variable length codes in as little as one clock, depending on the specific code table in use and the specific code being decoded.

The PVLD 306 is designed to support the worst-case requirement for VLD operation with MPEG-2 HDTV (MP@HL), while retaining its full programmability. The PVLD 306 includes a code table random access memory (RAM) for fastest performance. Code tables such a MPEG-2 video can fit entirely within the code RAM. Some formats, such as proprietary formats, may require larger code tables that do not fit entirely within the code RAM in the PVLD 306. For such cases, the PVLD 306 can make use of both the decoder memory 316 and the main memory as needed. Performance of VLC decoding is reduced somewhat when codes are searched in video memory 316 and main memory. Therefore, for formats that require large tables of VLC codes, the most common codes are typically stored in the PVLD code RAM, the next most common codes are stored in decoder memory, and the least common codes are stored in main memory. Also, such codes are stored in decoder memory 316 and main memory such that even when extended look-ups in decoder memory 316 and main memory are required, the most commonly occurring codes are found more quickly. This allows the overall performance to remain exceptionally high.

In an illustrative embodiment of the present invention, the PVLD 306 is architected as a coprocessor of the core processor 302. That is, it can operate on a single-command basis where the core processor issues a command (via a coprocessor instruction) and waits (via a Move From Coprocessor instruction) until it is executed by the PVLD 306, without polling to determine completion of the command. This increases performance when a large number of VLC codes are parsed under software control. Additionally, the PVLD 306 can operate on a block-command basis where the core processor 302 commands the PVLD 306 to decode a complete block of VLC codes, such as DCT coefficients, and the core processor 302 continues to perform other tasks in parallel. In this case, the core processor 302 verifies the completion of the block operation by checking a status bit in the PVLD 306. The PVLD produces results (tokens) that are stored in decoder memory 316.

The PVLD 306 checks for invalid codes and recovers gracefully from them. Invalid codes may occur in the coded bit stream for a variety of reasons, including errors in the video encoding, errors in transmission, and improper discontinuities in the stream.

The inverse quantizer module 308 performs run-level code (RLC) decoding, inverse scanning (also called zig-zag scanning), inverse quantization and mismatch control. The coefficients, such as DCT coefficients, extracted by the PVLD 306 are processed by the inverse quantizer 308 to bring the coefficients from the quantized domain to the DCT domain. In an exemplary embodiment of the present invention, the IQ module 308 obtains its input data (run-level values) from the decoder memory 316, as the result of the PVLD module 306 decoding operation. In an alternative embodiment, the IQ module 308 obtains its input data directly from the PVLD 306. This alternative embodiment is illustratively employed in conjunction with encoding/decoding algorithms that are relatively more involved, such as MPEG-2 HD decoding, for best performance. The run-length, value and end-of-block codes read by the IQ module 308 are compatible with the format created by the PVLD module when it decodes blocks of coefficient VLCs, and this format is not dependent on the specific video coding format being decoded. In an exemplary embodiment, the IQ 308 and inverse transform 309 modules form part of a tightly coupled module labeled transform engine 307. This embodiment has the advantage of providing fast communication between modules 308 and 309 by virtue of being implemented in the same hardware block.

The scan pattern of the IQ module 308 is programmable in order to be compatible with any required pattern. The quantization format is also programmable, and mismatch control supports a variety of methods, including those specified in MPEG-2 and MPEG-4. In an exemplary embodiment, the IQ module 308 can accommodate block sizes of 16×16, 8×8, 8×4, 4×8 and 4×4. In an illustrative embodiment of the present invention, the IQ module 308 includes one or more registers that are used to program the scan pattern, quantization matrix and mismatch control method. These registers are programmed by the core processor 302 to dictate the mode of operation of the IQ module. The IQ module 306 is designed in such a way that the core processor 302 can intervene at any point in the process, in case a particular decoding algorithm requires software processing of some aspect of the algorithmic steps performed by the IQ module 308. For example, there may be cases where an unknown algorithm could require a different form of rounding; this can be performed in the core processor 302. The IQ module 308 has specific support for AC prediction as specified in MPEG-4 Advanced Simple Profile. In an exemplary embodiment, the IQ module 308 also has specific support for the inverse quantization functions of the ISO-ITU NT (Joint Video Team) standard under development.

The inverse transform module 309 performs the inverse transform to convert the coefficients produced by the IQ module 308 from the frequency domain to the spatial domain. The primary transform supported is the IDCT, as specified in MPEG-2, MPEG-4, IEEE, and several other standards. The coefficients are programmable, and it can support alternative related transforms, such as the "linear" transform in H.26L (also known as JVT), which is not quite the same as IDCT. The inverse transform module 309 supports a plurality of matrix sizes, including 8×8, 4×8, 8×4 and 4×4 blocks. In an illustrative embodiment of the present invention, the inverse transform module 309 includes a register that is used to program the matrix size. This register is programmed by the core processor 302 according to the appropriate matrix size for the encoding/decoding format of the data stream being decoded.

In an illustrative embodiment of the present invention, the coefficient input to the inverse transform module 309 is read from decoder memory 316, where it was placed after inverse quantization by the IQ module 308. The transform result is written back to decoder memory 316. In an exemplary embodiment, the inverse transform module 309 uses the same memory location in decoder memory 316 for both its input and output, allowing a savings in on-chip memory usage. In an alternative embodiment, the coefficients produced by the IQ module are provided directly to the inverse transform module 309, without first depositing them in decoder memory 316. To accommodate this direct transfer of coefficients, in one embodiment of the present invention, the IQ module 308 and inverse transform module 309 use a common interface directly between them for this purpose. In an exemplary embodiment, the transfer of coefficients from the IQ module 308 to the inverse transform module 309 can be either direct or via decoder memory 316. For encoding/decoding algorithms that require very high rates of throughput, such as MPEG-2 HD decoding, the transfer is direct in order to save time and improve performance.

Figure 4B:
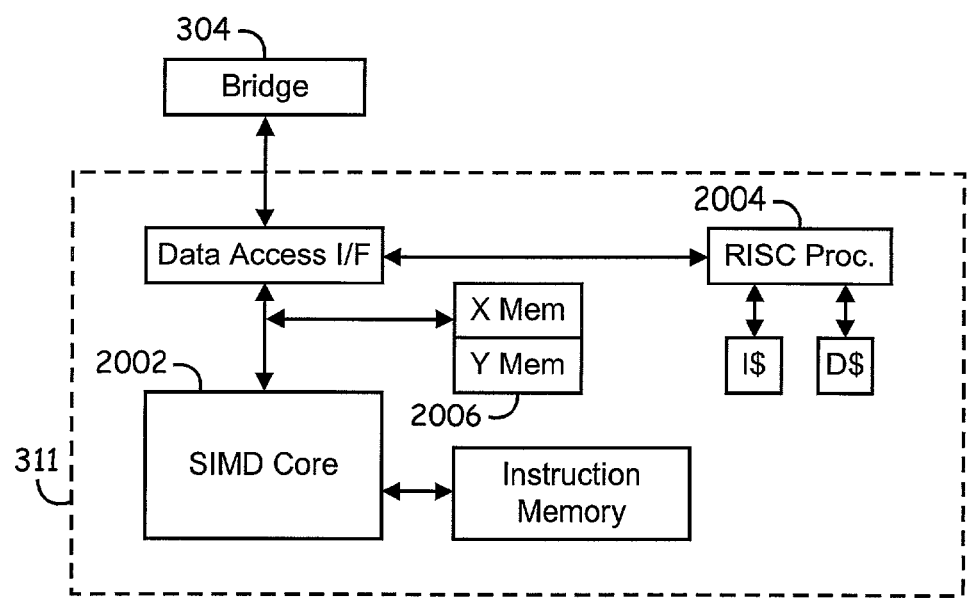
FIG. 4b is a functional block diagram of a motion compensation filter engine according to an illustrative embodiment of the present invention.

In an illustrative embodiment, the functionality of the PF 310 and MC 312 are implemented by means of a filter engine (FE) 311. The FE is the combination of an 8-way SIMD processor 2002 and a 32-bit RISC processor 2004, illustrated in FIG. 4b. Both processors operate at the same clock frequency. The SIMD engine 2002 is architected to be very efficient as a coprocessor to the RISC processor (internal MIPS) 2004, performing specialized filtering and decision-making tasks. The SIMD 2002 includes: a split X-memory 2006 (allowing simultaneous operations), a Y-memory, a Z-register input with byte shift capability, 16 bit per element inputs, and no branch or jump functions. The SIMD processor 2002 has hardware for three-level looping, and it has a hardware function call and return mechanism for use as a coprocessor. All of these help to improve performance and minimize the area. The RISC processor 2004 controls the operations of the FE 311. Its functions include the control of the data flow and scheduling tasks. It also takes care of part of the decision-making functions. The FE 311 operates like the other modules on a macro block basis under the control of the main core processor 302.

Referring again to FIG. 4a, the pixel filter 310 performs pixel filtering and interpolation as part of the motion compensation process. Motion compensation uses a small piece of an image from a previous frame to predict a piece of the current image; typically the reference image segment is in a different location within the reference frame. Rather than recreate the image anew from scratch, the previous image is used and the appropriate region of the image moved to the proper location within the frame; this may represent the image accurately, or more generally there may still be a need for coding the residual difference between this prediction and the actual current image. The new location is indicated by motion vectors that denote the spatial displacement in the frame with respect to the reference frame.

The pixel filter 310 performs the interpolation necessary when a reference block is translated (motion-compensated) by a vector that cannot be represented by an integer number of whole-pixel locations. For example, a hypothetical motion vector may indicate to move a particular block 10.5 pixels to the right and 20.25 pixels down for the motion-compensated prediction. In an illustrative embodiment of the present invention, the motion vectors are decoded by the PVLD 3D6 in a previous processing pipeline stage and are further processed in the core processor 302 before being passed to the pixel filter, typically via the decoder memory 316. Thus, the pixel filter 310 gets the motion information as vectors and not just bits from the bitstream. In an illustrative embodiment, the reference block data that is used by the motion compensation process is read by the pixel filter 310 from the decoder memory 316, the required data having been moved to decoder memory 316 from system memory 110; alternatively the pixel filter obtains the reference block data from system memory 110. Typically the pixel filter obtains the processed motion vectors from decode memory 316. The pixel data that results from motion compensation of a given macroblock is stored in memory after decoding of said macroblock is complete. In an illustrative embodiment, the decoded macroblock data is written to decoder memory 316 and then transferred to system memory 110; alternatively, the decoded macro block data may be written directly to system memory 110. If and when that decoded macroblock data is needed for additional motion compensation of another macroblock, the pixel filter 310 retrieves the reference macroblock pixel information from memory, as above, and again the reconstructed macroblock pixel information is written to memory, as above.

The pixel filter 310 supports a variety of filter algorithms, including ½ pixel and ¼ pixel interpolations in either or both of the horizontal and vertical axes; each of these can have many various definitions, and the pixel filter can be configured or programmed to support a wide variety of filters, thereby supporting a wide range of video formats, including proprietary formats. The PF module can process block sizes of 4, 8 or 16 pixels per dimension (horizontal and vertical), or even other sizes if needed. The pixel filter 310 is also programmable to support different interpolation algorithms with different numbers of filter taps, such as 2, 4, or 6 taps per filter, per dimension. In an illustrative embodiment of the present invention, the pixel filter 309 includes one or more registers that are used to program the filter algorithm and the block size. These registers are programmed by the core processor 302 according to the motion compensation technique employed with the encoding/decoding format of the data stream being decoded. In another illustrative embodiment, the pixel filter is implemented using the filter engine (FE) architecture, which is programmable to support any of a wide variety of filter algorithms. As such, in either type of embodiment, it supports a very wide variety of motion compensation schemes.

The motion compensation module 312 reconstructs the macroblock being decoded by performing the addition of the decoded difference (or residual or "error") pixel information from the inverse transform module 309 to the pixel prediction data from the output of the pixel filter 310. The motion compensation module 312 is programmable to support a wide variety of block sizes, including 16×16, 16×8, 8×16, 8×8, 8×4, 4×8 and 4×4. The motion compensation module 312 is also programmable to support different transform block types, such as field-type and frame-type transform blocks. The motion compensation module 312 is further programmable to support different matrix formats. Furthermore, MC module 312 supports all the intra and inter prediction modes in the H.26L/JVT proposed standard. In an illustrative embodiment of the present invention, the motion compensation module 312 includes one or more registers that are configurable to select the block size and format. These registers are programmed by the core processor 302 according to the motion compensation technique employed with the encoding/decoding format of the data stream being decoded. In another illustrative embodiment, the motion compensation module is a function of a filter engine (FE) that is serving as the pixel filter and motion compensation modules, and it is programmable to perform any of the motion compensation functions and variations that are required by the format being decoded.

The loop filter 313 and post filter 315 perform de-blocking filter operations. In an illustrative embodiment of the present invention, the loop filter 313 and post filter 315 are combined in one filter module 314, as shown in FIG. 3. The filter module 314 in an illustrative embodiment is the same processing structure as described for 311, except that it is programmed to perform the functionality of 313 and 315. Some decoding algorithms employ a loop filter and others employ a post filter. Therefore, the filter module 314 (or loop filter 313 and post filter 315 independently) is programmable to turn on either the loop filter 313 or the post filter 315 or both. In an illustrative embodiment, the filter module 314 (or loop filter 313 and post filter 315) has a register that controls whether a loop filter or post filter scheme is employed. The core processor 302 programs the filter module register(s) according to the bitstream semantics. The loop filter 313 and post filter 315 each have programmable coefficients and thresholds for performing a variety of de-blocking algorithms in either the horizontal or vertical directions. Deblocking is required in some low bit-rate algorithms. De-blocking is not required in MPEG-2. However, in one embodiment of the present invention, de-blocking is used to advantage with MPEG-2 at low bit rates.

In one embodiment of the present invention, the input data to the loop filter 313 and post filter 315 comes from decoder memory 316, the input pixel data having been transferred from system memory 110 as appropriate, typically at the direction of the core processor 302. This data includes pixel and block/macroblock parameter data generated by other modules in the decoding system 300. The output data from the loop filter 313 and post filter 315 is written into decoder memory 316. The core processor 302 then causes the processed data to be put in its correct location in system memory 110. The core processor 302 can program operational parameters into loop filter 313 and post filter 315 registers at any time. In an illustrative embodiment, all parameter registers are double buffered. In another illustrative embodiment the loop filter 313 and post filter 315 obtain input pixel data from system memory 110, and the results may be written to system memory 110.

The loop filter 313 and post filter 315 are both programmable to operate according to any of a plurality of different encoding/decoding algorithms. In the embodiment wherein loop filter 313 and post filter 315 are separate hardware units, the loop filter 313 and post filter 315 can be programmed similarly to one another. The difference is where in the processing pipeline each filter 313, 315 does its work. The loop filter 313 processes data within the reconstruction loop and the results of the filter are used in the actual reconstruction of the data. The post filter 315 processes data that has already been reconstructed and is fully decoded in the two-dimensional picture domain. In an illustrative embodiment of the present invention, the coefficients, thresholds and other parameters employed by the loop filter 313 and the post filter 315 (or, in the alternative embodiment, filter module 314) are programmed by the core processor 302 according to the de-blocking technique employed with the encoding/decoding format of the data stream being decoded.

The core processor 302, bridge 304, PVLD 306, IQ 308, inverse transform module 309, pixel filter 310, motion compensation module 312, loop filter 313 and post filter 315 have access to decoder memory 316 via the internal bus 322 or via equivalent functionality in the bridge 304. In an exemplary embodiment of the present invention, the PVLD 306, IQ 308, inverse transform module 309, pixel filter 310, motion compensation module 312, loop filter 313 and post filter 315 use the decoder memory 316 as the source and destination memory for their normal operation. In another embodiment, the PLVD 306 uses the system memory 110 as the source of its data in normal operation. In another embodiment, the pixel filter 310 and motion compensation module 312, or the equivalent function in the filter module 314, use the decoder memory 316 as the source for residual pixel information and they use system memory 110 as the source for reference pixel data and as the destination for reconstructed pixel data. In another embodiment, the loop filter 313 and post processor 315, or the equivalent function in the filter module 314, use system memory 110 as the source and destination for pixel data in normal operation. The CPU has access to decoder memory 316, and the DMA engine 304 can transfer data between decoder memory 316 and the main system memory 110. The arbiter for decoder memory 316 is in the bridge module 304. In an illustrative embodiment, decoder memory 316 is a static random access memory (SRAM) unit.

The bridge module 304 performs several functions. In an illustrative embodiment, the bridge module 304 includes an interconnection network to connect all the other modules of the MVP as shown schematically as internal bus 322 and register bus 324. It is the bridge between the various modules of decoding system 300 and the system memory. It is the bridge between the register bus 324, the core processor 302, and the main chip-level register bus. It also includes a DMA engine to service the memories within the decoder system 300, including decoder memory 316 and local memory units within individual modules such as PVLD 306. The bridge module illustratively includes an asynchronous interface capability and it supports different clock rates in the decoding system 300 and the main memory bus, with either clock frequency being greater than the other.

The bridge module 304 implements a consistent interface to all of the modules of the decoding system 300 where practical. Logical register bus 324 connects all the modules and serves the purpose of accessing control and status registers by the main core processor 302. Coordination of processing by the main core processor 302 is accomplished by a combination of accessing memory, control and status registers for all modules.

In an illustrative embodiment of the present invention, the display feeder 318 module reads decoded pictures (frames or fields, as appropriate) from main memory in their native decoded format (4:2:0, for example), converts the video into 4:2:2 format, and performs horizontal scaling using a polyphase filter. According to an illustrative embodiment of the present invention, the coefficients, scale factor, and the number of active phases of the polyphase filter are programmable. In an illustrative embodiment of the present invention, the display feeder 318 includes one or more registers that are used to program these parameters. These registers are programmed by the core processor 302 according to the desired display format. In an exemplary embodiment the polyphase filter is an 8 tap, 11 phase filter. The output is illustratively standard 4:2:2 format YCrCb video, in the native color space of the coded video (for example, ITU-T 709-2 or ITU-T 601-B color space), and with a horizontal size that ranges, for example, from 160 to 1920 pixels. The horizontal scaler corrects for coded picture sizes that differ from the display size, and it also provides the ability to scale the video to arbitrary smaller or larger sizes, for use in conjunction with subsequent 2-dimensional scaling where required for displaying video in a window, for example. In one embodiment, the display feeder 318 is adapted to supply two video scan lines concurrently, in which case the horizontal scaler in the feeder 318 is adapted to scale two lines concurrently, using identical parameters.

Figure 5:
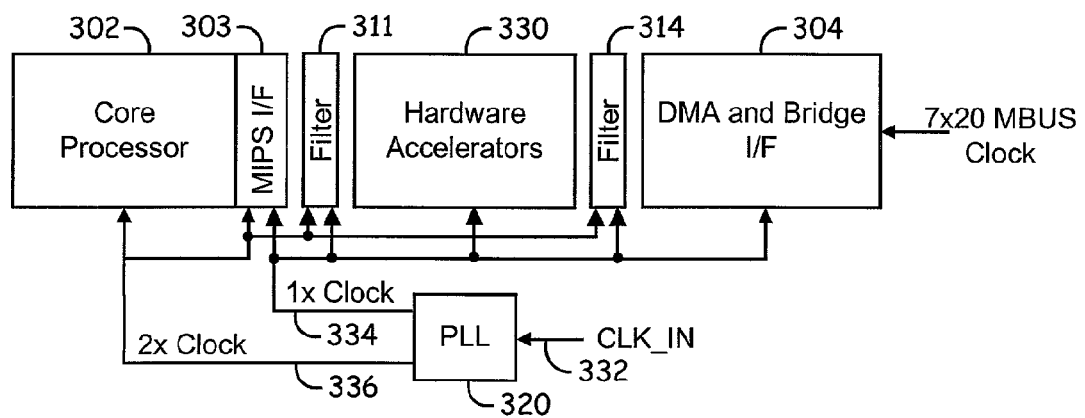
FIG. 5 is a block diagram depicting a clocking scheme for a decoding system according to an illustrative embodiment of the present invention.

FIG. 5 is a block diagram depicting a clocking scheme for decoding system 300 according to an illustrative embodiment of the present invention. In FIG. 5, elements that are common to FIGS. 3 and 4 are given like reference numbers. Hardware accelerators block 330 includes PVLD 306, IQ 308, inverse transform module 309, pixel filter 310, motion compensation module 312 and filter engine 314. In an illustrative embodiment of the present invention, the core processor 302 runs at twice the frequency of the other processing modules. In another related illustrative embodiment, hardware accelerator block 330 includes PVLD 306, IQ 308, and inverse transform module 309, while one instance of the filter engine module 311 implements pixel filter 310 and motion compensation 312, and yet another instance of the filter module 314 implements loop filter 313 and post filter 315, noting that FE 311 and FE 314 receive both 243 MHz and 121.5 MHz clocks. In an exemplary embodiment, the core processor runs at 243 MHz and the individual modules at half this rate, i.e., 121.5 MHz. An elegant, flexible and efficient clock strategy is achieved by generating two internal clocks in an exact 2:1 relationship to each other. The system clock signal (CLK_IN) 332 is used as input to the phase locked loop element (PLL) 320, which is a closed-loop feedback control system that locks to a particular phase of the system clock to produce a stable signal with little jitter. The PLL element 320 generates a 1× clock (targeting, e.g., 121.5 MHz) for the hardware accelerators 330, bridge 304 and the core processor bus interface 303, while generating a 2× clock (targeting, e.g., 243 MHz) for the core processor 302 and the core processor bus interface 303.

Referring again to FIGS. 3 and 4, for typical video formats such as MPEG-2, picture level processing, from the sequence level down to the slice level, including the sequence headers, picture headers, time stamps, and buffer management, are performed directly and sequentially by the core processor 302. The PVLD 306 assists the core processor when a bit-field in a header is to be decoded. Picture level processing does not overlap with macroblock level decoding.

The macroblock level decoding is the main video decoding process. It occurs within a direct execution loop. In an illustrative embodiment of the present invention, hardware blocks PVLD 306, IQ 308, inverse transform module 309, pixel filter 310, motion compensation module 312 (and, depending on which decoding algorithm is being executed, possibly loop filter 313) are all involved in the decoding loop. The core processor 302 controls the loop by polling the status of each of the hardware blocks involved.

Still another aspect of the present invention is directed to a method of decoding a digital media data stream. Pursuant to this method, media data of a first encoding/decoding format is received. At least one external decoding function, such as variable-length decoding or inverse quantization, e.g., is configured based on the first encoding/decoding format. Media data of the first encoding/decoding format is decoded using the at least one external decoding function. Media data of a second encoding/decoding format is received. The at least one external decoding function is configured based on the second encoding/decoding format. Then media data of the second encoding/decoding format is decoded using the at least one external decoding function.

Figure 6:
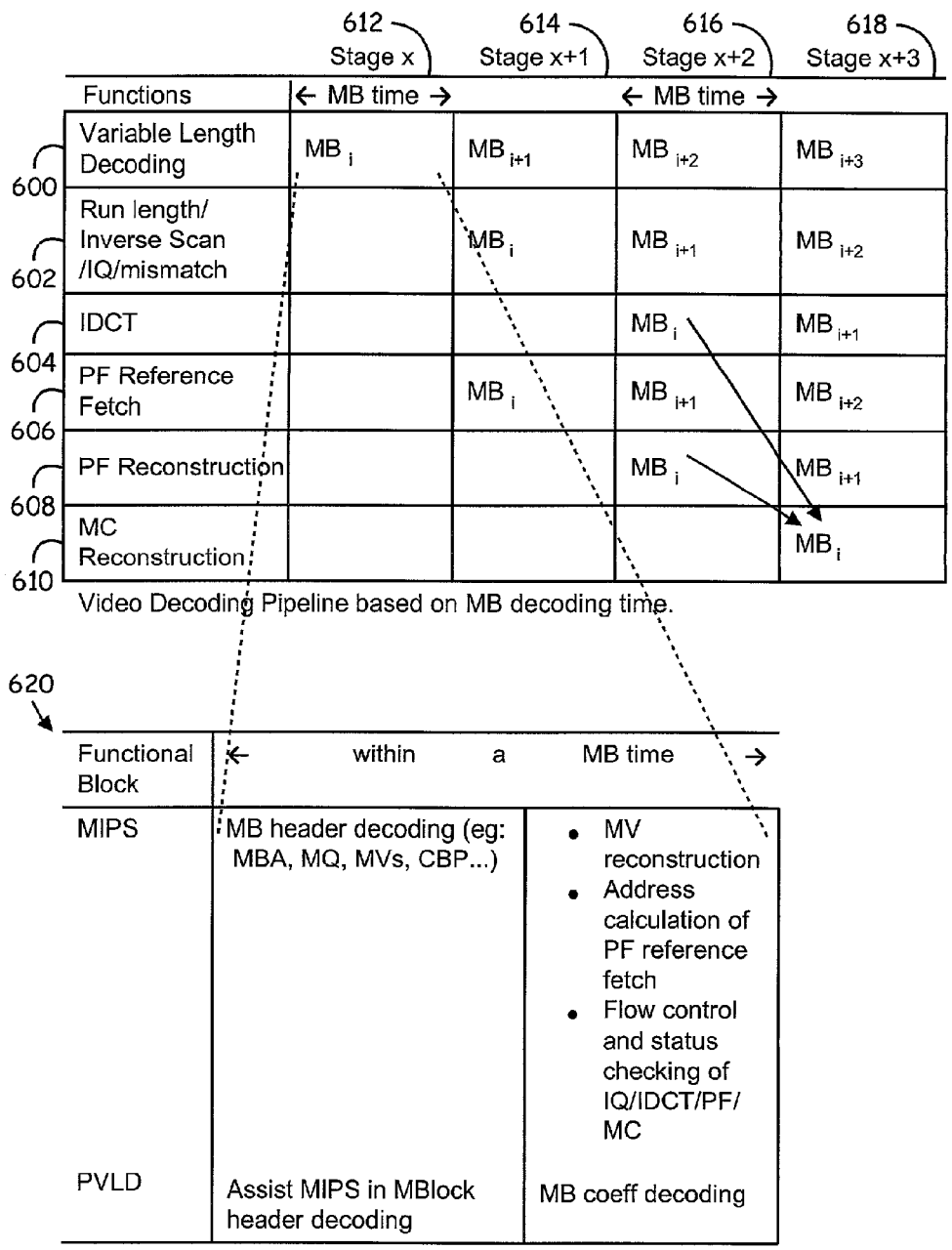
FIG. 6 is a chart representing a decoding pipeline according to an illustrative embodiment of the present invention.

In an illustrative embodiment of the present invention, the actions of the various hardware blocks are arranged in an execution pipeline comprising a plurality of stages. As used in the present application, the term "stage" can refer to all of the decoding functions performed during a given time slot, or it can refer to a functional step, or group of functional steps, in the decoding process. The pipeline scheme aims to achieve maximum throughput in defined worst case decoding scenarios. Pursuant to this objective, it is important to utilize the core processor efficiently. FIG. 6 is a chart representing a decoding pipeline according to an illustrative embodiment of the present invention. The number of decoding functions in the pipeline may vary depending on the target applications. Due to the selection of hardware elements that comprise the pipeline, the pipeline architecture of the present invention can accommodate, at least, substantially any existing or future compression algorithms that fall into the general class of block-oriented algorithms.

The rows of FIG. 6 represent the decoding functions performed as part of the pipeline according to an exemplary embodiment. Variable length decoding 600 is performed by PVLD 306. Run length/inverse scan/IQ/mismatch 602 are functions performed by IQ module 308. Inverse transform operations 604 are performed by the inverse transform module 309. Pixel filter reference fetch 606 and pixel filter reconstruction 608 are performed by pixel filter 310. Motion compensation reconstruction 610 is performed by motion compensation module 312. The columns of FIG. 6 represent the pipeline stages. The designations $MB_i$, $MB_{i+1}$, $MB_{i+2}$, etc. represent the $i^{th}$ macroblock in a data stream, the $i+1^{st}$ macroblock in the data stream, the $i+2^{nd}$ macroblock, and so on. The pipeline scheme supports one pipeline stage per module, wherein any hardware module that depends on the result of another module is arranged in a following MB pipeline stage. In an illustrative embodiment, the pipeline scheme can support more than one pipeline stage per module.

At any given stage in the pipeline, while a given function is being performed on a given macroblock, the next macroblock in the data stream is being worked on by the previous function in the pipeline. Thus, at stage x 612 in the pipeline represented in FIG. 6, variable length decoding 600 is performed on MBi. Exploded view 620 of the variable length decoding function 600 demonstrates how functions are divided between the core processor 302 and the PVLD 306 during this stage, according to one embodiment of the present invention. Exploded view 620 shows that during stage x 612, the core processor 302 decodes the macroblock header of $MB_i$. The PVLD 306 assists the core processor 302 in the decoding of macroblock headers. The core processor 302 also reconstructs the motion vectors of $MB_i$, calculates the address of the pixel filter reference fetch for $MB_i$, performs pipeline flow control and checks the status of IQ module 308, inverse transform module 309, pixel filter 310 and motion compensator 312 during stage x 612. The hardware blocks operate concurrently with the core processor 302 while decoding a series of macroblocks. The core processor 302 controls the pipeline, initiates the decoding of each macroblock, and controls the operation of each of the hardware accelerators. The core processor firmware checks the status of each of the hardware blocks to determine completion of previously assigned tasks and checks the buffer availability before advancing the pipeline. Each block will then process the corresponding next macroblock. The PVLD 306 also decodes the macro block coefficients of MBi during stage x. Block coefficient VLC decoding is not started until the core processor 302 decodes the whole macro block header. Note that the functions listed in exploded view 620 are performed during each stage of the pipeline of FIG. 6, even though, for simplicity's sake, they are only exploded out with respect to stage x 612.

At the next stage x+1 614, the inverse quantizer 308 works on $MB_i$ (function 602) while variable length decoding 600 is performed on the next macroblock, $MB_{i+1}$. In stage x+1 614, the data that the inverse quantizer 308 works on are the quantized transform coefficients of $MB_i$ extracted from the data stream by the PVLD 306 during stage x 612. In an exemplary embodiment of the present invention, also during stage x+1 614, the pixel filter reference data is fetched for $MB_i$ (function 606) using the pixel filter reference fetch address calculated by the core processor 302 during stage x 612.

Then, at stage x+2 616, the inverse transform module 309 performs inverse transform operations 604 on the $MB_i$ transform coefficients that were output by the inverse quantizer 308 during stage x+1. Also during stage x+2, the pixel filter 310 performs pixel filtering 608 for $MB_i$ using the pixel filter reference data fetched in stage x+1 614 and the motion vectors reconstructed by the core processor 302 in stage x 612. Additionally at stage x+2 616, the inverse quantizer 308 works on $MB_{i+1}$ (function 602), the pixel filter reference data is fetched for $MB_{i+1}$ (function 606), and variable length decoding 600 is performed on $MB_{i+2}$.

At stage x+3 618, the motion compensation module 312 performs motion compensation reconstruction 610 on $MB_i$ using decoded difference pixel information produced by the inverse transform module 309 (function 604) and pixel prediction data produced by the pixel filter 310 (function 608) in stage x+2 616. Also during stage x+3 618, the inverse transform module 309 performs inverse transform operations 604 on $MB_{i+1}$, the pixel filter 310 performs pixel filtering 608 for $MB_{i+1}$, the inverse quantizer 308 works on MBi+2 (function 602), the pixel filter reference data is fetched for $MB_{i+2}$ (function 606), and variable length decoding 600 is performed on $MB_{i+3}$. While the pipeline of FIG. 6 shows just four pipeline stages, in an illustrative embodiment of the present invention, the pipeline includes as many stages as is needed to decode a complete incoming data stream.

In an alternative embodiment of the present invention, the functions of two or more hardware modules are combined into one pipeline stage and the macroblock data is processed by all the modules in that stage sequentially. For example, in an exemplary embodiment, inverse transform operations for a given macroblock are performed during the same pipeline stage as IQ operations. In this embodiment, the inverse transform module 309 waits idle until the inverse quantizer 308 finishes and the inverse quantizer 308 becomes idle when the inverse transform operations start. This embodiment will have a longer processing time for the "packed" pipeline stage, and therefore such embodiments may have lower throughput. The benefits of the packed stage embodiment include fewer pipeline stages, fewer buffers and possibly simpler control for the pipeline.

The above-described macroblock-level pipeline advances stage-by-stage. Conceptually, the pipeline advances after all the tasks in the current stage are completed. The time elapsed in one macroblock pipeline stage will be referred to herein as the macroblock (MB) time. In the general case of decoding, the MB time is not a constant and varies from stage to stage according to various factors, such as the amount of processing time required by a given acceleration module to complete processing of a given block of data in a given stage. It depends on the encoded bitstream characteristics and is determined by the bottleneck module, which is the one that finishes last in that stage. Any module, including the core processor 302 itself, could be the bottleneck from stage to stage and it is not pre-determined at the beginning of each stage.

However, for a given encoding/decoding algorithm, each module, including the core processor 302, has a defined and predetermined task or group of tasks to complete. The macroblock time for each module is substantially constant for a given decoding standard. Therefore, in an illustrative embodiment of the present invention, the hardware acceleration pipeline is optimized by hardware balancing each module in the pipeline according to the compression format of the data stream.

The main video decoding operations occur within a direct execution loop that also includes polling of the accelerator functions. The coprocessor/accelerators operate concurrently with the core processor while decoding a series of macro blocks. The core processor 302 controls the pipeline, initiates the decoding of each macro block, and controls the operation of each of the accelerators. The core processor also does a lot of actual decoding, as described in previous paragraphs. Upon completion of each macroblock processing stage in the core processor, firmware checks the status of each of the accelerators to determine completion of previously assigned tasks. In the event that the firmware gets to this point before an accelerator module has completed its required tasks, the firmware polls for completion. This is appropriate, since the pipeline cannot proceed efficiently until all of the pipeline elements have completed the current stage, and an interrupt driven scheme would be less efficient for this purpose. In an alternative embodiment, the core processor 302 is interrupted by the coprocessor or hardware accelerators when an exceptional occurrence is detected, such as an error in the processing task. In another alternative embodiment, the coprocessor or hardware accelerators interrupt the core processor when they complete their assigned tasks.

Each hardware module 306, 308, 309, 310, 312, 313, 315 is independently controllable by the core processor 302. The core processor 302 drives a hardware module by issuing a certain start command after checking the module's status. In one embodiment, the core processor 302 issues the start command by setting up a register in the hardware module.

Figure 7:
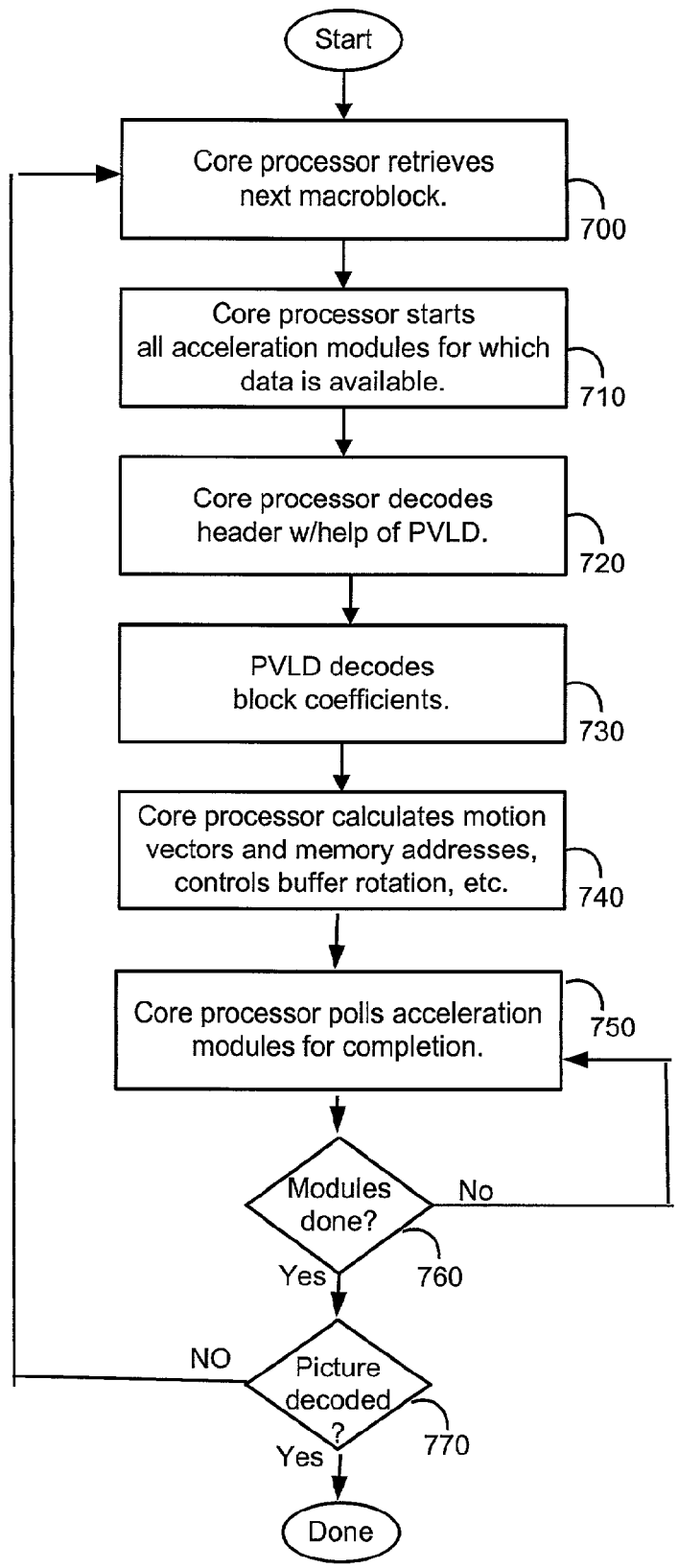
FIG. 7 is a flowchart representing a macroblock decoding loop according to an illustrative embodiment of the present invention.

FIG. 7 is a flowchart representing a macroblock decoding loop according to an illustrative embodiment of the present invention. FIG. 7 depicts the decoding of one video picture, starting at the macro block level. In an illustrative embodiment of the present invention, the loop of macroblock level decoding pipeline control is fully synchronous. At step 700, the core processor 302 retrieves a macroblock to be decoded from system memory 110. At step 710, the core processor starts all the hardware modules for which input data is available. The criteria for starting all modules depends on an exemplary pipeline control mechanism illustrated in FIG. 6. At step 720, the core processor 302 decodes the macroblock header with the help of the PVLD 306. At step 730, when the macroblock header is decoded, the core processor 302 commands the PVLD 306 for block coefficient decoding. At step 740, the core processor 302 calculates motion vectors and memory addresses, such as the pixel filter reference fetch address, controls buffer rotation and performs other housekeeping tasks. At step 750, the core processor 302 checks to see whether the acceleration modules have completed their respective tasks. At decision box 760, if all of the acceleration modules have completed their respective tasks, control passes to decision box 770. If, at decision box 760, one or more of the acceleration modules have not finished their tasks, the core processor 302 continues polling the acceleration modules until they have all completed their tasks, as shown by step 750 and decision box 760. At decision box 770, if the picture is decoded, the process is complete. If the picture is not decoded, the core processor 302 retrieves the next macroblock and the process continues as shown by step 700. In an illustrative embodiment of the present invention, when the current picture has been decoded, the incoming macroblock data of the next picture in the video sequence is decoded according to the process of FIG. 7.

In general, the core processor 302 interprets the bits decoded (with the help of the PVLD 306) for the appropriate headers and sets up and coordinates the actions of the hardware modules. More specifically, all header information, from the sequence level down to the macroblock level, is requested by the core processor 302. The core processor 302 also controls and coordinates the actions of each hardware module. The core processor configures the hardware modules to operate in accordance with the encoding/decoding format of the data stream being decoded by providing operating parameters to the hardware modules. The parameters include but are not limited to (using MPEG2 as an example) the cbp (coded block pattern) used by the PVLD 306 to control the decoding of the transform block coefficients, the quantization scale used by the IQ module 308 to perform inverse quantization, motion vectors used by the pixel filter 309 and motion compensation module 310 to reconstruct the macroblocks, and the working buffer address(es) in decoder memory 316.

Each hardware module 306, 308, 309, 310, 312, 313, 315 performs the specific processing as instructed by the core processor 302 and sets up its status properly in a status register as the task is being executed and when it is done. Each of the modules has or shares a status register that is polled by the core processor to determine the module's status. In an alternative embodiment, each module issues an interrupt signal to the core processor so that in addition to polling the status registers, the core processor can be informed asynchronously of exceptional events like errors in the bitstream. Each hardware module is assigned a set of macroblock buffers in decoder memory 316 for processing purposes. In an illustrative embodiment, each hardware module signals the busy/available status of the working buffer(s) associated with it so that the core processor 302 can properly coordinate the processing pipeline.

In an exemplary embodiment of the present invention, the hardware accelerator modules 306, 308, 309, 319, 312, 313, 314, 315 generally do not communicate with each other directly. The accelerators work on assigned areas of decoder memory 316 and produce results that are written back to decoder memory 316, in some cases to the same area of decoder memory 316 as the input to the accelerator, or results are written back to main memory. In one embodiment of the present invention, when the incoming bitstream is of a format that includes a relatively large amount of data, or of a relatively complex encoding/decoding format, the accelerators in some cases may bypass the decoder memory 316 and pass data between themselves directly.

Software codecs from other sources, such as proprietary codecs, are ported to the decoding system 300 by analyzing the code to isolate those functions that are amenable to acceleration, such as variable-length decoding, run-length coding, inverse scanning, inverse quantization, transform, pixel filter, motion compensation, de-blocking filter, and display format conversion, and replacing those functions with equivalent functions that use the hardware accelerators in the decoding system 300. In an exemplary embodiment of the present invention, modules 310, 312 and 313, 315 are implemented in a programmable SIMD/RISC filter engine module (311 and 314 respectively) that allows execution of a wide range of decoding algorithms, even ones that have not yet been specified in by any standards body. Software representing all other video decoding tasks is compiled to run directly on the core processor.

Figure 8:
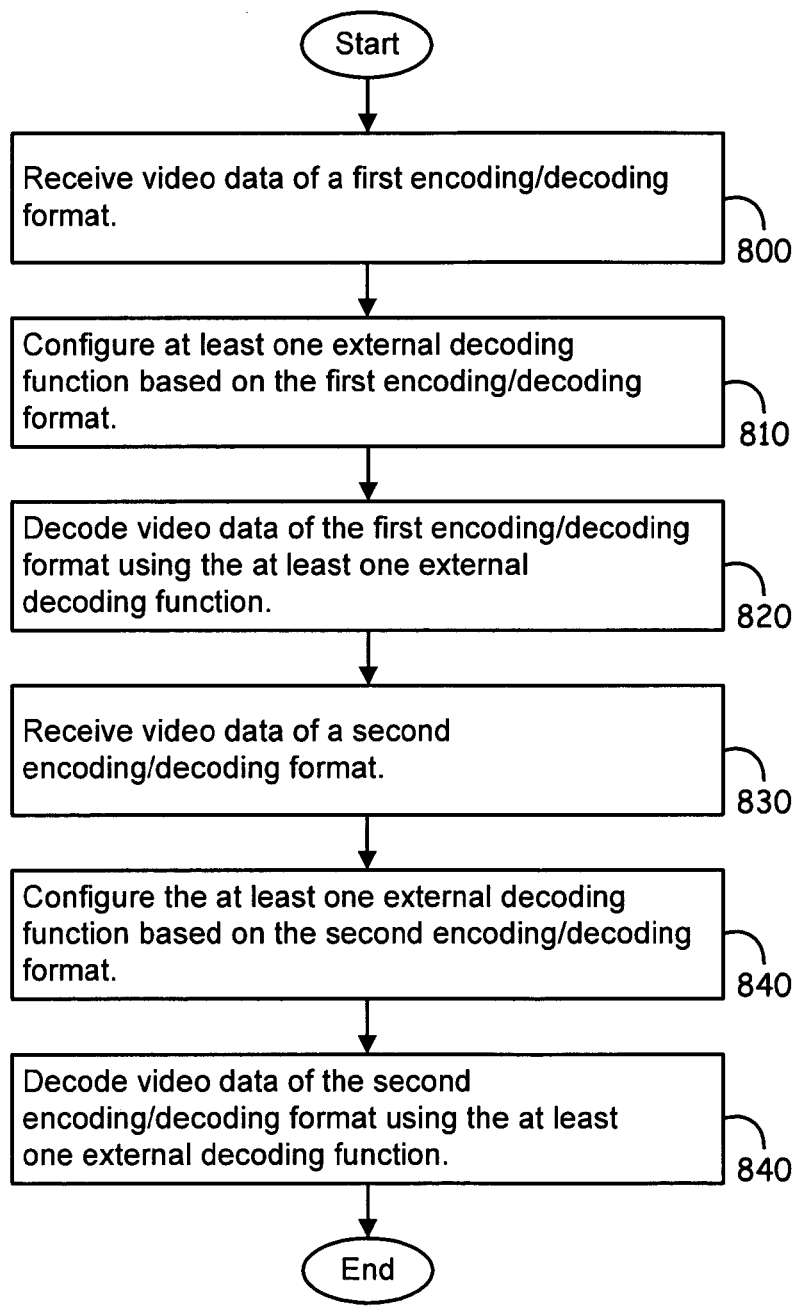
FIG. 8 is a flowchart representing a method of decoding a digital video data stream containing more than one video data format, according to an illustrative embodiment of the present invention.

In an illustrative embodiment of the present invention, some functions are interrupt driven, particularly the management of the display, i.e., telling the display module which picture buffer to display from at each field time, setting display parameters that depend on the picture type (e.g. field or frame), and performing synchronization functions. The decoding system 300 of the present invention provides flexible configurability and programmability to handle different video stream formats. FIG. 8 is a flowchart representing a method of decoding a digital video data stream or set of streams containing more than one video data format, according to an illustrative embodiment of the present invention. At step 800, video data of a first encoding/decoding format is received. At step 810, at least one external decoding function, such as variable-length decoding or inverse quantization: is configured based on the first encoding/decoding format. At step 820, video data of the first encoding/decoding format is decoded using the at least one external decoding function. In an illustrative embodiment of the present invention, a full picture, or a least a full row, is processed before changing formats and before changing streams. At step 830, video data of a second encoding/decoding format is received. At step 840, at least one external decoding function is configured based on the second encoding/decoding format. Then, at step 850, video data of the second encoding/decoding format is decoded using the at least one external decoding function. In an exemplary embodiment, the at least one decoding function is performed by one or more of hardware accelerators 306, 308, 309, 310, 312, 313, 314 and 315. The hardware accelerators are programmed or configured by the core processor 302 to operate according to the appropriate encoding/decoding format. As is described above with respect to the individual hardware accelerators of FIGS. 3 and 4, in one illustrative embodiment the programming for different decoding formats is done through register read/write. The core processor programs registers in each module to modify the operational behavior of the module.

In another illustrative embodiment, some or all of the hardware accelerators comprise programmable processors which are configured to operate according to different encoding/decoding formats by changing the software executed by those processors, in addition to programming registers as appropriate to the design. Although a preferred embodiment of the present invention has been described, it should not be construed to limit the scope of the appended claims. For example, the present invention is applicable to any type of media, including audio, in addition to the video media illustratively described herein. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A method of decoding digital media data streams, comprising:
   (a) configuring a first decoding accelerator and a second decoding accelerator to respectively perform a first decoding function and a second decoding function on a data stream in a first media format;
   (b) in a first stage, performing a first decoding function on an $i^{th}$ data element of the data stream with the first decoding accelerator;
   (c) in a second stage, after the first stage, performing a second decoding function on the $i^{th}$ data element with the second decoding accelerator, while performing the first decoding function on an $i+1^{st}$ data element in the data stream with the first decoding accelerator;
   (d) configuring the first decoding accelerator and the second decoding accelerator to respectively perform a first decoding function and a second decoding function on a data stream in a second media format; and
   (e) repeating steps (b) and (c).

2. The method of claim 1, wherein the second decoding function for a given data element is dependent upon a result of the first decoding function for the given data element.

3. The method of claim 1, further comprising:
   (c) in a third stage, after the second stage, performing a third decoding function on the $i^{th}$ data element with a third decoding accelerator, while performing the second decoding function on the $i+1^{st}$ data element with the second decoding accelerator and performing the first decoding function on an $i+2^{nd}$ data element in the data stream with the first decoding accelerator.

4. The method of claim 3, wherein the second decoding function for a given data element is dependent on a result of the first decoding function for the given data element, and wherein the third decoding function for a given data element is dependent upon a result of the second decoding function for the given data element.

5. The method of claim 1:
   wherein step (a) comprises, in the first stage, performing a third decoding function on the $i^{th}$ data element of the data stream with a third decoding accelerator while performing the first decoding function on the $i^{th}$ data element with the first decoding accelerator; and
   wherein step (b) comprises, in the second stage, performing the second decoding function on the $i^{th}$ data element with the second decoding accelerator, while performing the first and third decoding functions on an $i+1^4$ data element in the data stream with the first and third decoding accelerators, respectively.

6. The method of claim 5, wherein the second decoding function for a given data element is dependent upon a result of both the first decoding function and the third decoding function for the given data element.

7. The method of claim 6, wherein the data stream is a video data stream and wherein the first decoding function comprises an inverse discrete cosine transform operation, the second decoding function comprises a motion compensation operation, and the third decoding operation comprises a pixel filtering operation.

8. The method of claim 1, wherein the data stream is a video data stream.

9. The method of claim 8, wherein the data elements represent macroblocks of a digital video image.

10. A system comprising:
   a first decoding accelerator configured to perform a first decoding function on a first data element of a data stream during a first decoding stage, the first decoding accelerator further being configured to perform the first decoding function on a second data element of the data stream during a second decoding stage; and
   a second decoding accelerator configured to perform a second decoding function on the first data element during the second decoding stage.

11. The system of claim 10, wherein the second decoding accelerator is further configured to perform the second decoding function based upon a result of the first decoding function.

12. The system of claim 10, wherein:
the first decoding accelerator is further configured to perform the first decoding function on a third data element during a third decoding stage; and
the second decoding accelerator is further configured to perform the second decoding function on the second data element during the third decoding stage.

13. The system of claim 12, further comprising:
a third decoding accelerator configured to perform a third decoding function on the first data element during the third decoding stage.

14. The system of claim 13, wherein:
the second decoding accelerator is further configured to perform the second decoding function based upon a result of the first decoding function;
the third decoding accelerator is further configured to perform the third decoding function based upon a result of the second decoding function.

15. The system of claim 12, wherein the second decoding accelerator is further configured to perform the second decoding function based upon a result of the first decoding function.

16. A system, comprising:
a first decoding accelerator configured to perform an inverse discrete cosine transform (IDCT) on a first macroblock of a video data stream during a first decoding stage, the first decoding accelerator further being configured to perform the IDCT on a second macroblock of the video data stream during a second decoding stage; and
a second decoding accelerator configured to perform motion compensation on the first macroblock during the second decoding stage.

17. The system of claim 16, wherein:
the first decoding accelerator is further configured to perform the IDCT on a third macroblock of the video data stream during a third decoding stage; and
second decoding accelerator is further configured to perform the motion compensation on the second macroblock during the third decoding stage.

18. The system of claim 17, further comprising:
a third decoding accelerator configured to perform pixel filtering on the first macroblock during the third decoding stage; and
wherein the second decoding accelerator is further configured to perform the motion compensation based upon a result of the IDCT; and
wherein the third decoding accelerator is further configured to perform the pixel filtering based upon a result of the motion compensation.

19. The system of claim 17, wherein the second decoding accelerator is further configured to perform the motion compensation based upon a result of the IDCT.

20. The method of claim 1, wherein step (e) further comprises repeating steps (b) and (c) for a data element of a second data stream.

* * * * *